(12) United States Patent
Lin et al.

(10) Patent No.: US 8,087,812 B2
(45) Date of Patent: Jan. 3, 2012

(54) LIGHT GUIDE DEVICE AND BACKLIGHT MODULE

(75) Inventors: Ming-Chuan Lin, Taichung (TW);
Kuang-Min Wu, Taichung (TW);
Chiu-Chih Fu, Changhua County (TW);
Hsing-Fa Wang, Taichung County
(TW); Shih-Cheng Wang, Changhua
County (TW); Tsung-Yi Lin, Taichung
(TW)

(73) Assignee: Wintek Corporation, Taichung (TW)

( * ) Notice: Subject to any disclaimer, the term of this patent is extended or adjusted under 35 U.S.C. 154(b) by 329 days.

(21) Appl. No.: 12/470,722

(22) Filed: May 22, 2009

(65) Prior Publication Data

US 2009/0303748 A1 Dec. 10, 2009

(30) Foreign Application Priority Data

Jun. 5, 2008 (TW) .............................. 97209889 U

(51) Int. Cl.
*G02F 1/1335* (2006.01)

(52) U.S. Cl. ..................... 362/633; 366/97.1; 366/634

(58) Field of Classification Search ........ 362/97.1–97.4, 362/631–634; 349/58–61
See application file for complete search history.

(56) References Cited

U.S. PATENT DOCUMENTS

| 7,665,878 | B2 * | 2/2010 | Hsieh ............................ 362/633 |
| 7,800,707 | B2 * | 9/2010 | Hsieh ............................. 349/58 |
| 7,819,573 | B2 * | 10/2010 | Kawashima et al. ......... 362/633 |
| 7,883,259 | B2 * | 2/2011 | Hung et al. .................. 362/634 |
| 7,901,126 | B2 * | 3/2011 | Jeong ........................... 362/632 |
| 2007/0019440 | A1 * | 1/2007 | Fang ............................ 362/633 |
| 2007/0291513 | A1 * | 12/2007 | Zhou et al. ................... 362/633 |
| 2008/0007971 | A1 * | 1/2008 | Hsieh ........................... 362/633 |
| 2009/0237596 | A1 * | 9/2009 | Park et al. ..................... 349/69 |

FOREIGN PATENT DOCUMENTS

TW 200611025 4/2006

* cited by examiner

*Primary Examiner* — Anabel Ton
(74) *Attorney, Agent, or Firm* — WPAT., P.C.; Justin King

(57) ABSTRACT

A light guide device and a backlight module. The backlight module comprises a light guide device and a plurality of light sources. The light guide device comprises a housing, comprising a frame around the housing; and a light guide plate, integrated inside the frame and comprising a light-emitting surface on one side of the light guide plate inside the frame and a light-receiving surface on one edge of the light guide plate, wherein a plurality of slots are disposed between the light guide plate and the frame and on other edges different from the edge whereon the light-receiving surface is disposed, and each of a plurality of barriers is disposed on an inner side of the light guide plate while being adjacent to one of the plurality of slots. The barriers are capable of reflecting the light traveling toward the frame back to the backlight module to improve the light efficiency.

24 Claims, 4 Drawing Sheets

LIGHT GUIDE DEVICE AND BACKLIGHT MODULE

BACKGROUND OF THE INVENTION

1. Field of the Invention

The present invention generally relates to a backlight module and, more particularly, to backlight module comprising a light guide device having a light guide plate with barriers on the edges.

2. Description of the Prior Art

The currently available backlight module is assembled using a light guide plate and a housing. Alternatively, the backlight module may comprise a transparent light guide plate and a housing that are integrated. Such a process is applicable to the manufacture of displays for handsets because of compactness, easy assembly and simple structures. In Taiwan Patent Publication No. 200611025, as shown in FIG. 1, a light guide structure comprises a light guide plate 11 and a housing 13. The light guide plate 11 and the housing 13 are integrated. The light guide plate 11 comprises a light-receiving surface 12, a light-emitting surface 14 adjacent to the light-receiving surface 12 and a plurality of breaches 16. The breaches 16 are disposed where the light guide plate 11 and housing 13 are joined. Each breach 16 comprises an arc corner 161 and an edge surface 162 adjacent to the arc corner 161. The edge surface 162 is frosted.

However, even though the aforesaid conventional structure is simple and easy to be assembled, it has problems in that:

(1) Light leakage occurs due to such assembly of a light guide plate and a housing. Therefore, a handset using such a backlight module suffers from light leakage if it is not properly designed.

(2) Light efficiency is lowered because of light leakage.

Therefore, there is demand in providing a backlight module comprising a light guide device having a light guide plate with barriers on the edges.

SUMMARY OF THE INVENTION

It is one object of the present invention to provide a backlight module using a barrier structure to block the light leakage and reflect the light back to the backlight module to improve the light efficiency.

In order to achieve the foregoing object, the present invention provides a light guide device, comprising:

a housing, comprising a frame around the housing; and a light guide plate, integrated inside the frame and comprising a light-emitting surface on one side of the light guide plate inside the frame and a light-receiving surface on one edge of the light guide plate, wherein a plurality of slots are disposed between the light guide plate and the frame and on other edges different from the edge whereon the light-receiving surface is disposed, and each of a plurality of barriers is disposed on an inner side of the light guide plate while being adjacent to one of the plurality of slots.

The present invention further provides a backlight module, comprising:

a light guide device, comprising:

a housing, comprising a frame around the housing; and a light guide plate, integrated inside the frame and comprising a light-emitting surface on one side of the light guide plate inside the frame and a light-receiving surface on one edge of the light guide plate, wherein a plurality of slots are disposed between the light guide plate and the frame and on other edges different from the edge whereon the light-receiving surface is disposed, and each of a plurality of barriers is disposed on an inner side of the light guide plate while being adjacent to one of the plurality of slots; and a plurality of light sources, disposed facing the light-receiving surface of the light guide plate.

Moreover, a compartment is formed in the barrier structure so that an optical film is disposed in the compartment to prevent the optical film from shifting. Moreover, the size of the housing of the backlight module can be changed so that the barrier structure can be used to protect the optical film and reduce the cost.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

The present invention providing a micro reflection-type liquid crystal display can be exemplified by the preferred embodiments as described hereinafter.

Figure 1:
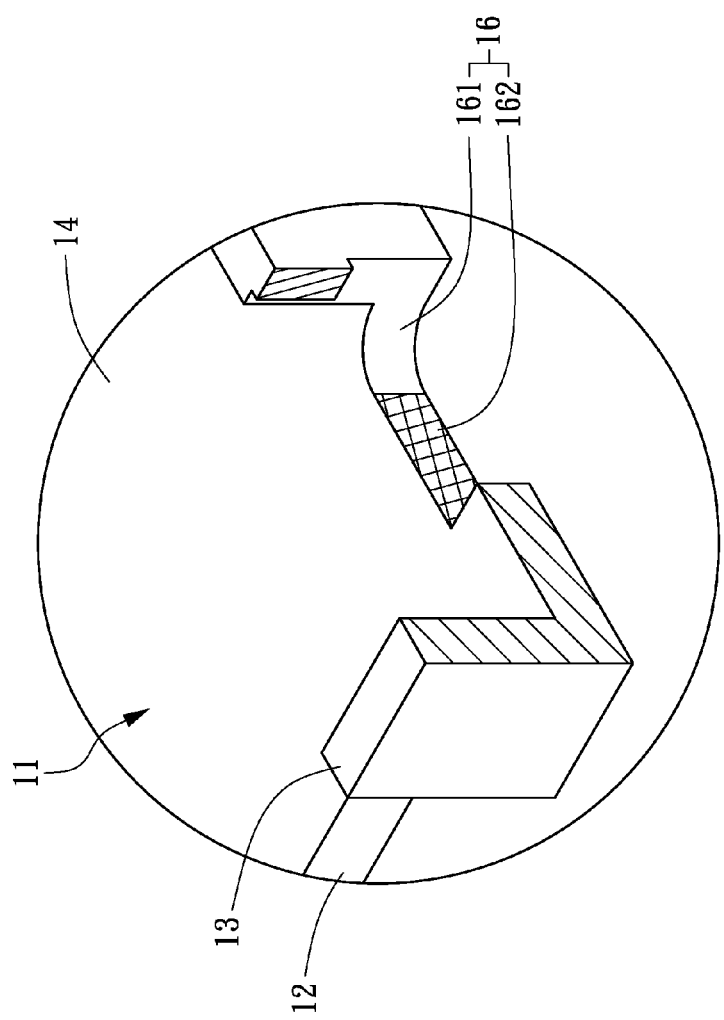
FIG. 1 is a conventional light guide structure.
Figure 2:
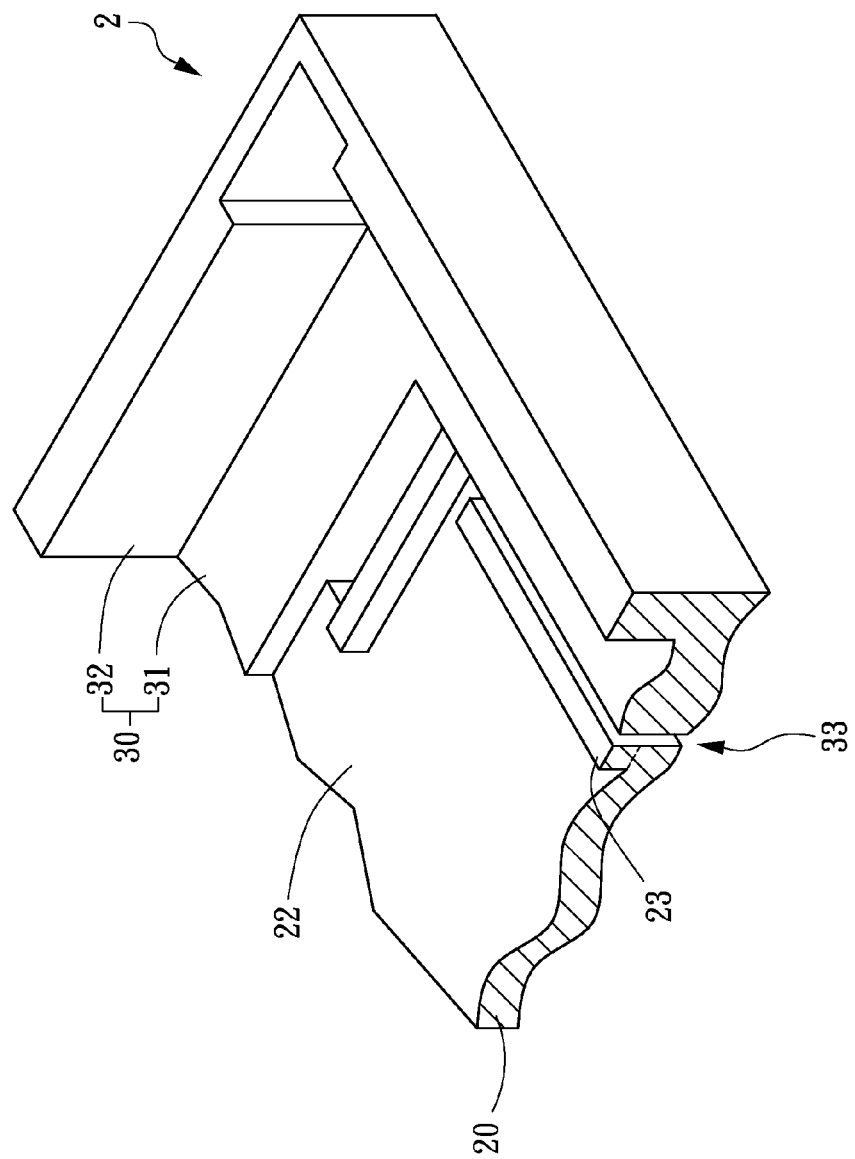
FIG. 2 is a 3-D view of a light guide device according to the present invention.

Referring to FIG. 2, a 3-D view of a light guide device according to the present invention is shown. The light guide device 2 comprises a light guide plate 20 and a housing 30 around the light guide plate 20.

Figure 4:
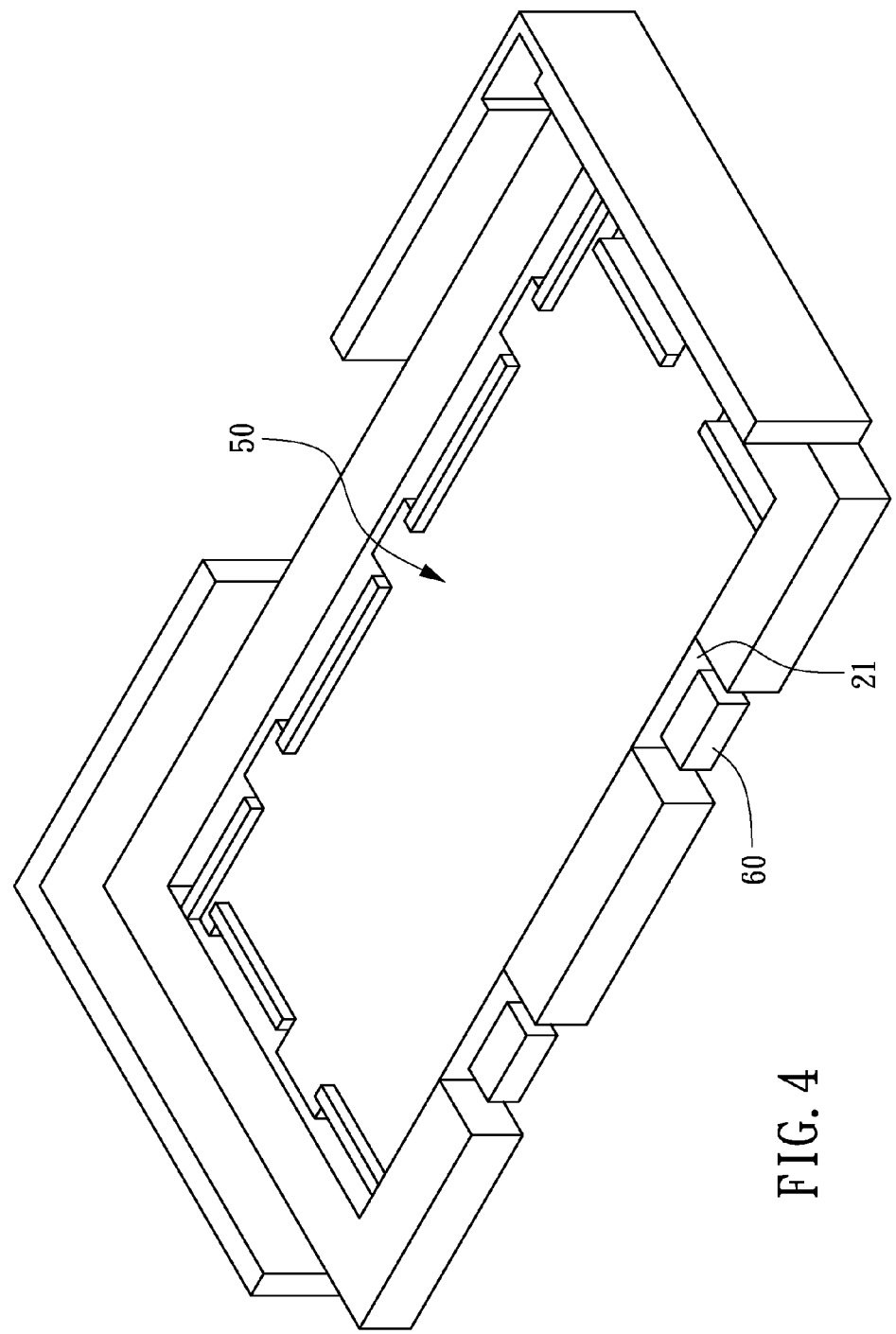
FIG. 4 is a 3-D view of a backlight module according to the present invention.

The light guide plate 20 is transparent. The light guide plate 20 comprises a light-receiving surface 21 (as shown in FIG. 4) and a light-emitting surface 22 adjacent to the light-receiving surface 21. A plurality of barriers 23 are disposed on an inner side of the light guide plate 20 and on three edges of the light-emitting surface 22 to prevent light leakage and reflect the light towards the housing 30 back to the light guide plate 20.

The housing 30 is transparent. The housing 30 and the light guide plate 20 are integrated by single injection. Alternatively, the housing 30 is non-transparent. The housing 30 and the light guide plate 20 are integrated by double injection. The housing comprises a rim 31 and a frame 32. The housing 30 is frame-shaped. The rim 31 is formed between the frame 32 and the light guide plate 20. There is a height difference (H) between the rim 31 and the frame 32. A plurality of slots 33 are disposed between the light guide plate 20 and the rim 31. Each of the slots 33 is adjacent to one of the barriers 23 and the rim 31. The barriers 23 are continuous or non-continuous with spacings. The top surfaces of the barriers 23 and the surface of the rim 31 are at the same horizontal height.

Figure 3:
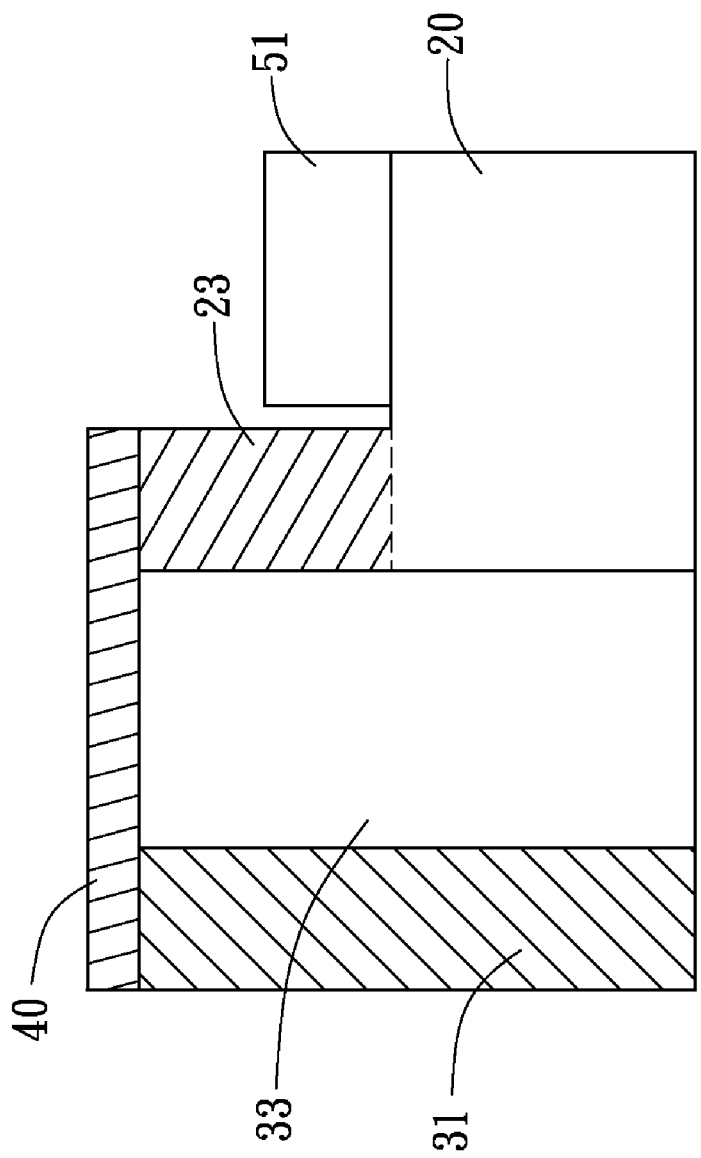
FIG. 3 is a cross-sectional view of a light guide device according to the present invention.

Please further refer to FIG. 3, which is a cross-sectional view of a light guide device according to the present invention. A mask 40 is disposed across the top surfaces of the barriers 23 and the surface of the rim 31. The mask 40 is an opaque layer, for example, an opaque double-sided adhesive tape. However, the mask 40 is not limited thereto and can be any other opaque layer. Furthermore, a reflection plate is disposed on one side of the light guide plate 20 different from the side whereon the barriers 23 are disposed. A compartment 50 (as shown in FIG. 4) is surrounded by the barriers 23 on the light guide plate 20 to receive an optical module 51.

Please further refer to FIG. 4, which is a 3-D view of a backlight module according to the present invention. The backlight module of the present invention comprises the aforesaid light guide device and a plurality of light sources 60. The plurality of light sources 60 are disposed facing the light-receiving surface 21 of light guide device 2. The light sources 60 are light-emitting diodes.

Accordingly, the present invention discloses a backlight module using a barrier structure to block the light leakage and reflect the light back to the backlight module to improve the light efficiency. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A light guide device, comprising:
a housing, comprising a frame and a rim; and
a transparent light guide plate, integrated inside the frame and comprising a light-emitting surface on one side of said transparent light guide plate, a first edge, a second edge, a third edge, a fourth edge, and a light-receiving surface on said first edge, wherein a plurality of slots are disposed between said transparent light guide plate and said frame, and, adjacent to said second edge, said third edge, and fourth edge, and a plurality of barriers disposed on said light emitting surface and adjacent to said second edge, said third edge, and said fourth edge to prevent light leakage and to reflect the light toward said housing and back to said transparent light guide plate;
wherein each of said plurality of barriers is adjacent to one of said plurality of slots.

2. The light guide device as recited in claim 1, wherein a rim is formed between the frame and the light guide plate.

3. The light guide device as recited in claim 1, wherein the barriers are continuous or non-continuous.

4. The light guide device as recited in claim 1, wherein the housing and the light guide plate are formed as a single integral unit by double injection.

5. The light guide device as recited in claim 1, wherein the housing is transparent.

6. The light guide device as recited in claim 1, wherein the housing is opaque.

7. The light guide device as recited in claim 1, wherein the light guide plate is transparent.

8. The light guide device as recited in claim 1, wherein the top surfaces of the barriers and the surface of the rim are at the same height along a horizontal plane.

9. The light guide device as recited in claim 1, wherein a mask is disposed across the top surfaces of the barriers and the surface of the rim.

10. The light guide device as recited in claim 9, wherein the mask is an opaque layer.

11. The light guide device as recited in claim 10, wherein the opaque layer is an opaque double-sided adhesive tape.

12. A backlight module, comprising:
a light guide device, comprising:
a housing, comprising a frame and a rim; and
a transparent light guide plate, integrated inside the frame and comprising a light-emitting surface on one side of said transparent light guide plate, a first edge, a second edge, a third edge, a fourth edge, and a light-receiving surface on said first edge, wherein a plurality of slots are disposed between said transparent light guide plate and said frame and, adjacent to said second edge, said third edge, and fourth edge, and a plurality of barriers disposed on said light emitting surface and adjacent to said second edge, said third edge, and said fourth edge to prevent light leakage and to reflect the light toward said housing and back to said transparent light guide plate, wherein each of said plurality of barriers is disposed on an inner side of said light guide plate while being adjacent to one of said plurality of slots; and
a plurality of light sources, disposed facing said light-receiving surface.

13. The backlight module as recited in claim 12, wherein the barriers are continuous or non-continuous.

14. The backlight module as recited in claim 12, wherein the housing is transparent.

15. The backlight module as recited in claim 12, wherein the housing is opaque.

16. The backlight module as recited in claim 12, wherein the light guide plate is transparent.

17. The backlight module as recited in claim 12, wherein the housing and the light guide plate are formed as a single integral unit by double injection.

18. The backlight module as recited in claim 12, wherein the top surfaces of the barriers and the surface of the rim are at the same horizontal height.

19. The backlight module as recited in claim 12, wherein a mask is disposed across the top surfaces of the barriers and the surface of the rim.

20. The backlight module as recited in claim 19, wherein the mask is an opaque layer.

21. The backlight module as recited in claim 20, wherein the opaque layer is an opaque double-sided adhesive tape.

22. The backlight module as recited in claim 12, wherein the plurality of light sources are light-emitting diodes.

23. The backlight module as recited in claim 12, wherein a reflection plate is disposed on one side of the light guide plate different from the side whereon the barriers are disposed.

24. The backlight module as recited in claim 12, wherein a compartment is surrounded by the barriers on the light guide plate to receive an optical module.

* * * * *